United States Patent [19]

Wilkins

[11] Patent Number: 4,580,933
[45] Date of Patent: Apr. 8, 1986

[54] CUTTING TOOL ACCESSORY

[75] Inventor: Larry C. Wilkins, New Albany, Ind.

[73] Assignee: Electromechanical Research Laboratories, Inc., New Albany, Ind.

[21] Appl. No.: 549,162

[22] Filed: Nov. 7, 1983

Related U.S. Application Data

[63] Continuation-in-part of Ser. No. 415,430, Sep. 7, 1982, abandoned.

[51] Int. Cl.⁴ .............................................. B23B 51/08
[52] U.S. Cl. ....................................... 408/118; 10/140; 408/193; 408/225
[58] Field of Search ............... 408/191, 225, 224, 118, 408/193; 10/140

[56] References Cited

U.S. PATENT DOCUMENTS

| | | | |
|---|---|---|---|
| 2,661,642 | 12/1953 | Marcucci | 408/191 |
| 3,575,520 | 4/1971 | Halpern | 408/191 |
| 3,635,573 | 1/1972 | Halpern | 408/225 X |
| 3,794,438 | 2/1974 | Knutsson | 408/224 X |
| 3,877,099 | 4/1975 | Halpern | 10/140 |
| 4,032,251 | 6/1977 | Ribich | 408/225 X |
| 4,076,443 | 2/1978 | Halpern | 408/191 |

FOREIGN PATENT DOCUMENTS

| | | | |
|---|---|---|---|
| 628246 | 9/1961 | Canada | 10/140 |
| 2262445 | 12/1973 | Fed. Rep. of Germany | 408/191 |
| 236620 | 2/1945 | Switzerland | 10/140 |
| 944212 | 12/1963 | United Kingdom | 10/140 |

Primary Examiner—Gil Weidenfeld
Assistant Examiner—Glenn L. Webb
Attorney, Agent, or Firm—Woodard, Weikart, Emhardt & Naughton

[57] ABSTRACT

A twist drill is provided with a countersink and collar assembly. The countersink includes a body with a face which cooperates with a similar face of the collar to trap a pair of balls between them. The faces being conical, enable the balls to be driven radially inward into the drill flutes by tightening the collar onto the countersink. A chip deflector is provided at the cutting edges of the countersink.

12 Claims, 9 Drawing Figures

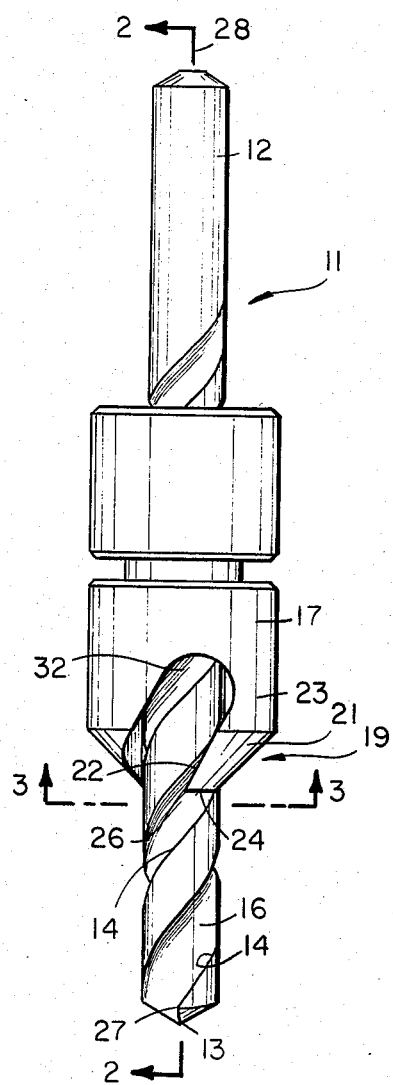
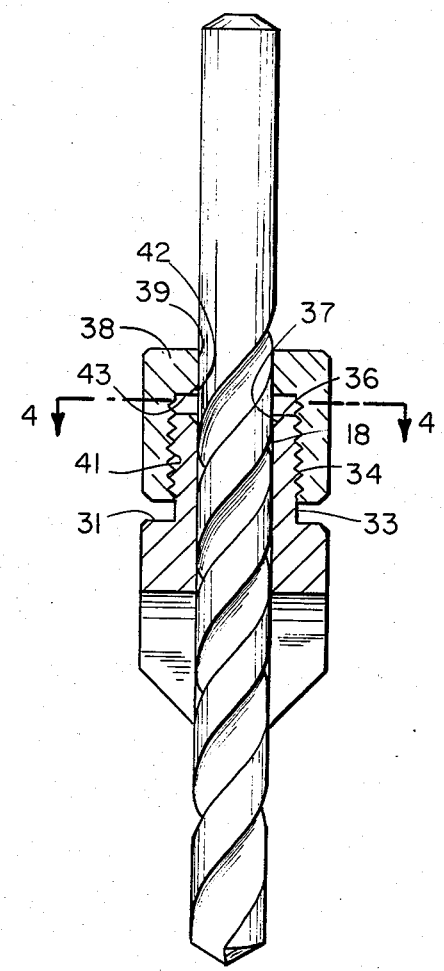
Fig.1
Fig.2
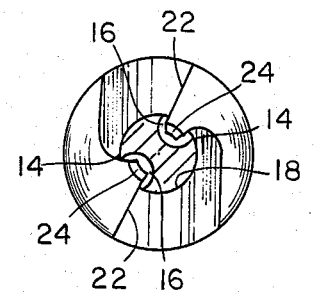
Fig.3
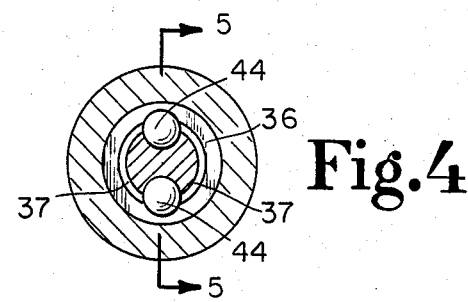
Fig.4
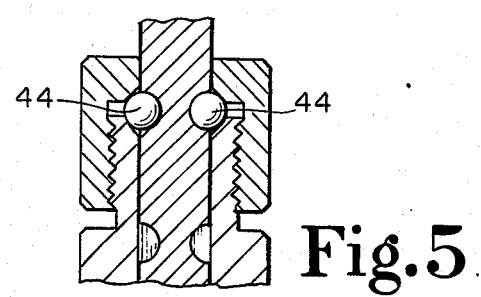
Fig.5

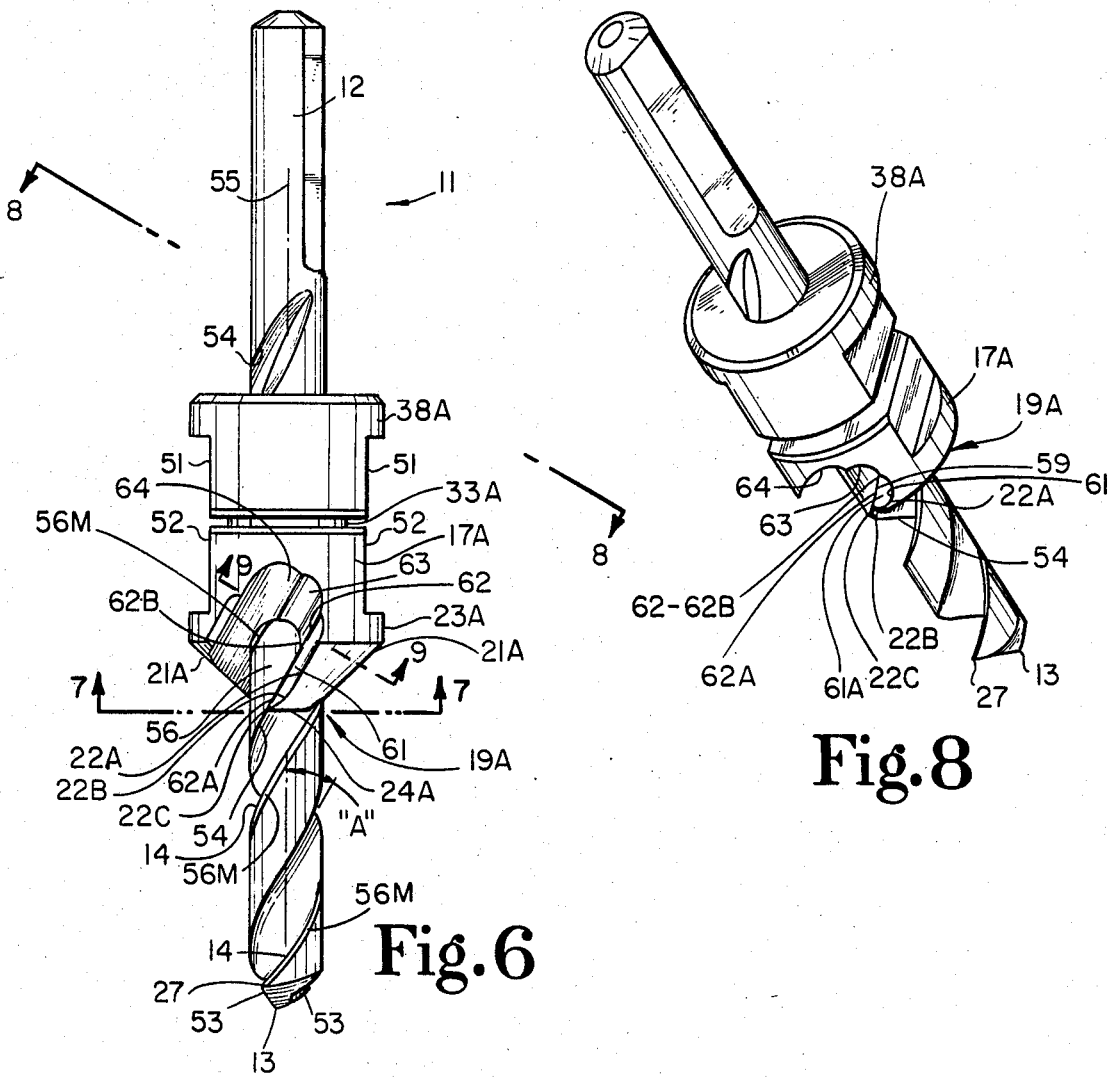
Fig. 6
Fig. 8
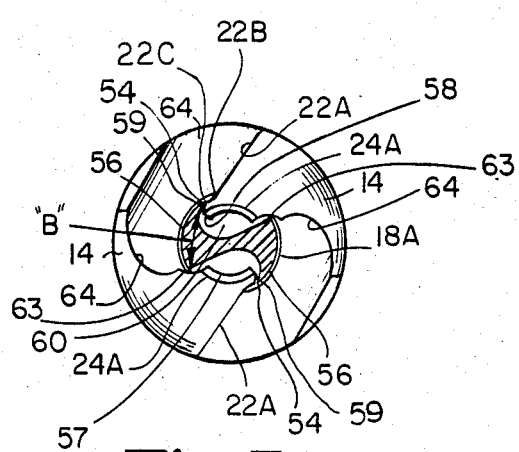
Fig. 7
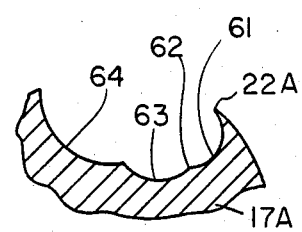
Fig. 9

CUTTING TOOL ACCESSORY

CROSS REFERENCE TO RELATED APPLICATION

This application is a continuation-in-part of my co-pending application Ser. No. 415,430, filed Sept. 7, 1982 abn.

BACKGROUND OF THE INVENTION

1. Field of the Invention

This invention relates generally to cutters for machine tools, and more particularly to a countersink cutter.

2. Description of the Prior Art

Many machined products require that drilled holes be countersunk. Originally this required that the hole first be drilled with a drill and then countersunk with a countersink. Then it was discovered that a countersink could be combined with a drill. Such an arrangement is very common in "center drills", where the countersink and drill are combined in one piece of tool steel, and used to drill and countersink the ends of a shaft for mounting on center in a lathe or the like.

One of the most recent developments of which I am aware in the combination of a drill with a countersink, is represented by a product of the Severance company of Saginaw, Mich. It is a countersink. Instead of a shank at the end opposite the cutting teeth, for mounting in a chuck, it has a central aperture extending from the rear end toward the cutting teeth. This aperture is of a diameter sufficient to receive a twist drill through the center of it, with the drill axis colinear with the rotational axis of the countersink cutting teeth. The teeth project slightly into the valleys (gullets) of the flutes. Therefore, although the central aperture is large enough for the drill shank to be received through it, the countersink is mounted onto the drill at the drill point so that the innermost tips of the countersink teeth can be received in the valleys of the flutes. The countersink has diametrically opposed transverse threaded apertures in the side of it intercepting the central aperture so that a set screw received in each of the apertures can be received in the flutes and tightened on opposite sides of the drill web, to hold the countersink in place. This has a disadvantage in that it requires that the set screws be carefully located on the drill. It is difficult to avoid a tendency of the countersink to work upward on the drill, during use.

The other drill-mounted countersink of which I am aware is one sold by Vernon Devices, Inc. of Mount Vernon, N.Y. It has a countersink mounted on the drill much like the above described countersink. The one cutting tooth does not project into the drill flute. In addition to a set screw holding the countersink directly to the drill, this device uses a separate collar fastened to the drill by a set screw. This collar is mounted end-to-end with the countersink. The collar has an axially extending threaded portion receiving a set screw in it. The axially extending set screw is screwed into the collar until it projects against the rear end of the countersink. It is further screwed into the collar and, bearing on the countersink, tends to put a slight misalignment of the countersink portion with the collar portion and thereby tighten these portions on the drill to keep them from moving rotationally or longitudinally. This has a disadvantage in that it puts a bending force on the drill, with the attendant irregularity of hole size or shape, and stress on the drill.

SUMMARY OF THE INVENTION

Described briefly, according to a typical embodiment of the present invention, there is a countersink and a clamp, both having central apertures. They are mounted on a twist drill and threaded together in end-to-end relationship. They employ clutch means confined by portions of the countersink and clamp and urged into tight fitting contact with the web of the drill to hold the countersink tightly to the drill at any desired axial location on fluted portion of the drill. In one embodiment a chip deflector is provided at the cutting edge of the countersink.

BRIEF DESCRIPTION OF THE DRAWINGS

FIG. 1 is an elevational view of a twist drill with the cutting tool accessory assembled thereon according to one embodiment of the present invention.

FIG. 2 is a section therethrough taken at line 2—2 in FIG. 1 and viewed in the direction of the arrows.

FIG. 3 is an end view thereof.

FIG. 4 is a section therethrough taken at line 4—4 in FIG. 2 and viewed in the direction of the arrows.

FIG. 5 is a section therethrough taken at line 5—5 in FIG. 4 and viewed in the direction of the arrows.

FIG. 6 is an elevational view of an assembly with the accessory according to another and now preferred embodiment of the invention.

FIG. 7 is an end view of the preferred embodiment.

FIG. 8 is a view taken at line 8—8 in FIG. 6 and viewed in the direction of the arrows.

FIG. 9 is a fragmentary section taken at line 9—9 in FIG. 6 and viewed in the direction of the arrows.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the conventional twist drill 11 includes a shank portion 12 and a tip 13. Two spiral "cutting" edges 14 are provided, one at each of the two flutes 16.

A countersink is provided in accordance with the present invention and has a body 17 with a central aperture 18 therein slidably received on the drill. At the front end portion 19 of the countersink, the surface is generally conical as at 21 with a 45° inclination (90° vortex angle). The front end has two cutting edges 22 which extend from the outer cylindrical surface 23 of the countersink body down to the tips 24 which are well inside the flutes 16 of the drill. Accordingly, the bottom point 26 of each of the cutting edges 22 is at a radius well inside the radius of the bottom point 27 of each of the spiral cutting edges 14 with respect to the drill axis 28.

At a point 31 well above the cutting edge 22, and above the chip clearance notch 32, the diameter of the body portion steps down to a threaded stem 33. The stem has threads 34 extending upward therefrom to an upper end 36. A conical surface 37 extends down from the top 36 to the central aperture 18.

The assembly also includes a collar 38 having a central aperture 39 received on the drill. The collar is threaded at 41 and threaded onto the stem of the countersink body. The collar also has a conical face 42 extending from the central aperture 39 down to the interior wall 43.

As best shown in FIG. 4, there are two balls 44 received in the flutes of the drill and resting on conical surface 37 adjacent the top of the countersink stem. As best shown in FIG. 5, where the axial spacing between the flutes is shown exaggerated, these balls also engage the conical surface 42 of the collar. In fact, the collar is tightened down onto the stem of the countersink body to clamp these balls between the conical surfaces and the flutes of the drill. So the collar serves as a clamp. The conical surfaces drive the balls radially inward into tight fitting clutching engagement with the drill web and thereby the assembly is fastened tightly onto the drill. Since the balls are at diametrically opposite locations, the locking forces applied to the drill, are balanced.

Referring now to FIGS. 6–9, there is shown a new and preferred embodiment of the invention. For the twist drill itself, the same reference numerals are used as were used in the description of the previous embodiment. Many of the features of the countersink and collar are the same or very similar to those described above with reference to the first embodiment, so are given the same reference numerals but with a suffix A. The collar 38A is the same as in the first embodiment, except for the addition of a pair of flats 5 which are provided to receive a wrench. Similarly, the countersink body 17A is provided with a pair of flats 52 to receive another wrench. This facilitates the tightening of the parts together for mounting on the drill, and loosening the parts when desired, to adjust the countersink assembly longitudinally of the drill, or remove it from the drill. Except for the addition of the flats, the collar is the same as collar 38 in the first embodiment. Likewise, the stem of the countersink, threads, internal balls and ramps are all the same as in the first embodiment. Therefore, they are not shown or further described herein.

In the description of this preferred embodiment, some additional features of the conventional twist drill should be noted for reference purposes. The edge 14 has been referred to as a cutting edge, this being the leading spiral edge of the drill rib as the drill is rotated in the normal forward cutting direction. It can serve to trim the walls of the hole and guide chips upward as the cutting edges 53 (the lips of the drill) at the drill point proceed to cut material from the bottom of the hole in the workpiece and start it up the flutes toward the top of the workpiece. The other edge 54 of the rib will be referred to hereinafter as the trailing edge. The drill rib surface 56 between edges 14 and 54 (the land of the drill) has a margin 56M beginning at the edge 14. At a given cross section of the drill, this entire margin is tangent the same imaginary cylinder about the drill axis as is the edge 14. At the point of the drill, the diameter of this cylinder is the nominal drill diameter. The drill diameter is decreased slightly from the point to the shank to prevent binding. The land has a portion of reduced diameter (the clearance diameter) behind the margin and which extends to the trailing edge of the land. In this context, the term "behind" is to be considered in the sense of a location in a circle centered on the drill axis and beginning at the leading edge of the rib, and continuing around to the trailing edge of the other rib of a two-fluted drill. The land clearance circle diameter is less than the margin circle diameter by an amount twice the rib clearance.

The conventional twist drill has a helix or spiral angle. The spiral angle "A" is depicted in FIG. 1 as the angle between a plane which is normal to the plane of the paper and contains the axis 55 of the drill, and the angle of the trailing edge 54 where it intersects the normal plane. This is typically 25°. This angle may decrease at greater distances from the drill point if the web thickness is increased from point to shank for increased strength.

In the preferred embodiment of the invention, the cutting edge 22A of the countersink extends from the outer cylindrical surface 23A of the countersink body downward at an angle very similar to the angle of the spiral of the drill. Accordingly, the angle of the cutting edge 22A, viewed in the same direction perpendicular to the paper as angle "A", is essentially the same as angle "A".

The inner wall of the countersink converges from the central aperture portion 18, which receives the lands of the drill, to the tips 24A which are inside the flutes and flattened as shown in FIG. 6. The inside surface of the tip portions is shown as circular at 57, flat at 58 and 59 in FIG. 7. The specific shape of this interior surface of the convergent portion is not critical so long as it provides whatever space is needed at 60 to accommodate the axial movement of the countersink on the drill for adjustment of the depth of the drilled hole before engagement of the countersink with the workpiece. However, it is important according to a feature of this embodiment of the invention, that the portion 59 of this surface immediately adjacent the trailing edge 54 of the drill spiral, be very close to the trailing edge as shown in FIGS. 6, 7 and 8, for a certain distance. This distance is determined by the chip-forming deflector groove feature of this embodiment of the invention. The illustrated chip-deflector groove 61 is shown to be semi-circular in the illustrated embodiment and it extends upward and outward. The radius of this groove can be different for different sizes of drills. A suitable relationship has been, for the radius of the chip deflector groove, 0.2 times the diameter of the drill. For example, for a 0.250 (quarter inch) drill, a chip deflector radius of 0.050 inches is desirable. For a ½ inch drill, a deflector radius of 0.100 inches has been found convenient. The smaller radius is suitable for a chip deflector in a countersink for the larger drill, but it is sometimes more convenient to use a larger radius on the countersink for the larger drill.

As best shown in FIG. 7, the countersink cutting edge curves at 22B and ends at 22C at the edge of leading wall surface 59, which also defines the bottom edge 62–62A of the deflector groove. At 22C, the direction of the cutting edge is parallel to a line tangent the circle of the central aperture, and then curves outward toward a more radial direction and in a cone having the desired countersink angle. The inner edge of the deflector groove is at 62 and is straight for a portion generally parallel to the cutting edge 22A but, if continued straight all the way to the tip 24A, would be well inside the flute. This is not desirable because it is desired that the face of the deflector groove 61 at the drill itself be almost tangent the cylinder of revolution of the drill land 56 which is exposed to the deflector groove. The diameter of this cylinder is the clearance diameter. Consequently, the lower portion of the deflector groove is formed not only with the cutting edge 22A curving up at 22B toward the point 22C, but also the edge 62 curving upward at 62A toward the point 22C. Thus, the end of the groove is curved upwardly at 61A to substantially meet the edge 54. The tangential starting direction of the cutting edge 22B from point 22C, and the tangential location of groove edge 62A provides cutting performance superior to a countersink with a cutting edge which is straight out of the flute.

Additional chip discharge space is provided by the chip clearance groove 63 adjacent deflector groove 62, and chip clearance groove 64 adjacent groove 63. While it is not essential that there be discrete grooves 63 and 64, this approach has been found convenient for manufacturing purposes. For example, groove 63 provides a conveniently shaped and controllable space for reception of the leading edge 14 of the drill on the side of the drill axis opposite that of the countersink cutting edge and deflector groove with which grooves 63 and 64 are directly associated. This can be seen in FIG. 7.

In view of the foregoing, it should be apparent that with the angle of surface 59 and thereby the edge 62A substantially equal to the spiral angle of the drill trailing edge 54, and immediately adjacent and preferably tangent the trailing edge, there is no opportunity for chips developed by the cutting edge 22A, to become impacted in the flutes of the drill. Instead, they are directed outwardly from the land of the drill toward the exterior. In addition, because of the upward and outward direction of the grooves 61, 63 and 64, the chips can move upward and away from the workpiece.

Total achievement of the outward direction of chips by the deflector surface 61 can be assured if the edge 62A is not just immediately adjacent, but is tangent the rib trailing edge 54 all the way from point 22C up to the point where the chip deflector surface no longer intercepts the clearance circle of the drill, but gives way to the chip clearance groove 63. In the illustrated embodiment, this point is 62B at the end of the chip deflector inner edge 62. To assist the operator in minimizing space between trailing edge 54 and wall 59 and approaching this totally tangent situation, the overall dimension "B" (FIG. 7) between point 22C and the groove 63 measured in a chordal way across the drill land, must be minimized. This enables the operator to use groove 63 as an abutment limiting movement of the countersink rotationally backward relative to the drill in a way which would open up a gap between edge 54 and wall 59. Yet, it is known that the land of a twist drill gets wider at greater distances from the drill point. Therefore, while it is desirable that the space between trailing edge 54 and leading wall 59 be minimized, it must be adequate to provide room for the land, regardless of where the countersink is located longitudinally of the drill. Therefore, this dimension "B" must be no less than the maximum chordal dimension across the land of the rib measured on the same line with the cutter clamped on the drill as far as possible from the drill point.

In manufacture of the accessory according to this embodiment of the invention, an end mill is used to generate the chip deflector groove. A ¼ inch end mill is used to generate the chip deflector for a countersink to be used on a ½ inch drill. A ⅛ inch end mill is used to generate the chip deflector for a ¼ inch drill accessory.

The description above mentioned a typical relationship between the radius of the chip deflector and the diameter of the drill on which the countersink is to be used. This radius might be changed somewhat if the characteristics of the material of which the countersink is to be used are such that a better performance could be obtained with a different relationship.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A twist drill-accessory cutter assembly comprising:
   a twist drill having a longitudinal axis and a fluted portion with spiral flutes forming spiral ribs with cutting edges thereon;
   a cutter having a body with a central aperture received on said fluted portion of said drill;
   and locking means engaging said drill and said cutter body to force said locking means tightly against said drill and said cutter body, whereby said assembly is secured tightly together,
   each of said drill ribs having a spiral leading edge and a spiral trailing edge, the ribs having portions of reduced diameter behind said cutting edges and defining a clearance circle centered on said axis;
   said cutter body having at least one tip portion projecting into one of the drill flutes;
   the cutter body tip portion having a leading wall immediately adjacent the said trailing edge of the particular rib which is ahead of said tip portion in the direction of forward rotation of the drill;
   said cutter body having a cutting edge extending outward from a point adjacent said particular rib,
   said cutter body having a chip-forming groove on said tip portion and having an end portion substantially tangent a circle whose axis is colinear with the axis of said clearance circle of the drill.

2. A twist drill-accessory cutter assembly comprising;
   a twist drill having a longitudinal axis and a fluted portion with spiral flutes forming spiral ribs with cutting edges thereon;
   a cutter having a body with a central aperture received on said fluted portion of said drill;
   and locking means engaging said drill and said cutter body to force said locking means tightly against said drill and said cutter body, whereby said assembly is secured tightly together,
   each of said drill ribs having a spiral leading edge and a spiral trailing edge, the ribs having portions of reduced diameter behind said cutting edges and defining a clearance circle centered on said axis; p1 said cutter body having at least one tip portion projecting into one of the drill flutes; p1 the cutter body tip portion having a leading wall immediately adjacent the said trailing edge of the particular rib which is ahead of said tip portion in the direction of forward rotation of the drill;
   said cutter body having a cutting edge extending outward from a point adjacent said particular rib,
   said cutter body having an integral non-planar chip-forming groove having a margin at said cutting edge and another margin having a form following the surface of the trailing wall of said particular rib, said leading wall extending longitudinally in said one flute from the distal end of said tip portion throughout the distance along said trailing edge of said particular rib where the chip forming groove intercepts said clearance circle of said drill.

3. A twist drill-accessory cutter assembly comprising:

a twist drill having a longitudinal axis and a fluted portion with spiral flutes forming spiral ribs with cutting edges thereon;

a cutter having a body with a central aperture received on said fluted portion of said drill;

and locking means engaging said drill and said cutter body to force said locking means tightly against said drill and said cutter body, whereby said assembly is secured tightly together, each of said drill ribs having a spiral leading edge and a spiral trailing edge, the ribs having portions of reduced diameter behind said cutting edges and defining a clearance circle centered on said axis;

said cutter body having at least one tip portion projecting into one of the drill flutes;

the cutter body tip portion having a leading wall immediately adjacent the said trailing edge of the particular rib which is ahead of said tip portion in the direction of forward rotation of the drill;

said cutter body having a cutting edge extending outward from a point adjacent said particular rib, said cutter body having a chip-forming groove having a margin at said cutting edge and another margin having a form following the form of the surface of the trailing wall of said particular rib;

said leading wall extending longitudinally in said one flute from a distal end of said tip portion throughout the distance along and lying coincidentally with said trailing edge of said particular rib where the chip forming groove intercepts the clearance circle of said drill, and said cutter cutting edge beginning at a first point substantially tangent said clearance circle and continuing radially outward and upward from said distal end.

4. The assembly of claim 3 wherein:

said cutter has a second tip portion substantially like said one tip portion and having its leading wall in the other of said flutes and immediately adjacent the trailing edge of the other of said ribs, said cutter being a countersink cutter.

5. The assembly of claim 3 wherein:

said chip forming groove is concave in cross section at the cutter cutting edge.

6. The assembly of claim 5 wherein:

said cutter cutting edge is a leading edge of said chip forming groove, and said groove has a trailing edge which begins at a point which is at a radius from the rotational axis of the drill, which is sufficient to turn outward from the flute, all material cut by said cutter cutting edge.

7. The assembly of claim 6 wherein:

the dimension measured in a chordal direction across said rib from said first point of the cutting edge to the nearest point on the cutter body, is at least as great as the maximum chordal dimension of said rib measured in the same direction when the assembly is clamped together at the maximum useful distance of the cutter from the drill point.

8. A cutter for use on a conventional spiral-fluted twist drill which has ribs and flutes, the ribs having leading the trailing edges and a clearance circle defined by portions behind the leading edges and comprising:

a body having front and rear ends and a central aperture extending therethrough from front to rear end and sized to slidingly and guidingly receive a twist drill therein;

said body having at least one tip portion at said front end and extending in toward the longitudinal axis of said aperture for reception in a flute of the drill;

said body having a cutting edge at said front end having a curved portion beginning at one point at said front end and proceeding from the curved portion with a straight portion; and p1 said body having a chip-forming groove having one margin which is said cutting edge and another margin having a curved portion beginning at said point at said front end and continuing in a curve for lying coincidentally with the trailing edge of the drill rib for turning chips outward from said rib of the drill ahead of the flute in which said tip portion is received, whereby chips made by said cutting edge are excluded from the drill flutes.

9. The accessory of claim 8 wherein:

said wall angle is substantially equal to the maximum helix angle of the drill.

10. The cutter of claim 8 wherein:

said chip forming groove is concave.

11. The cutter of claim 8 wherein:

the said central aperture has a cylindrical portion having a diameter sized for fitting sliding fit on a drill of the diameter with which the cutter is to be used, and said central aperture has a convergent portion at said tip portion; and said one point of beginning of said cutting edge and said chip forming groove is located at a radius from said axis substantially equal to the radius of the clearance circle of the drill with which the cutter is to be used.

12. The cutter of claim 8 wherein:

said cutting edge means starting point is at a wall of said tip portion and extends first in a direction parallel to a tangent to the projected cylinder of said cylindrical portion of said central aperture and then turns and continues radially outward and rearward from said tip portion.

* * * * *